Feb. 10, 1948. G. D. LEA ET AL 2,435,789
METHOD OF ELECTRIC SOLDERING
Original Filed April 13, 1943  5 Sheets-Sheet 1
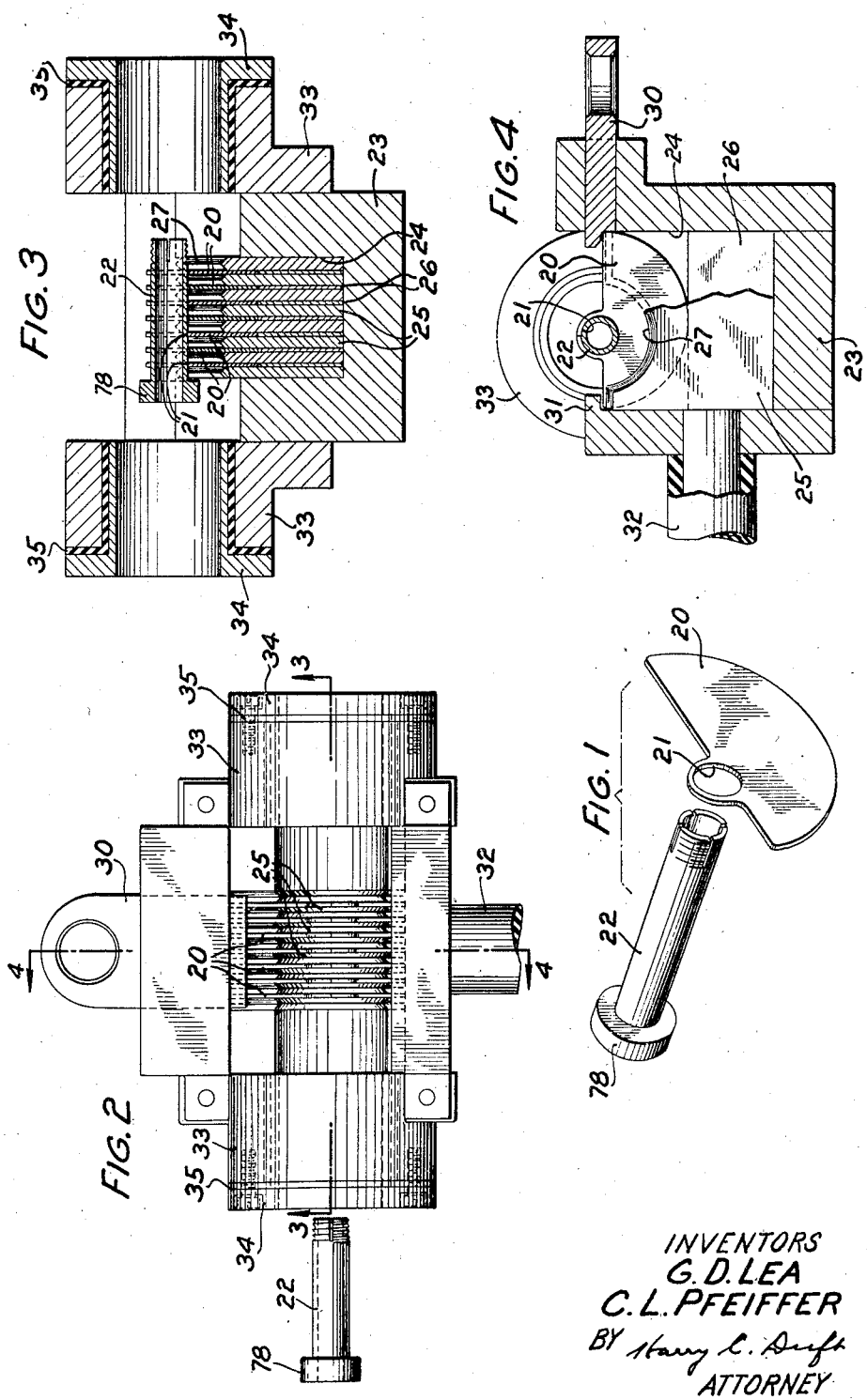
INVENTORS
G. D. LEA
C. L. PFEIFFER
BY Harry C. Duft
ATTORNEY

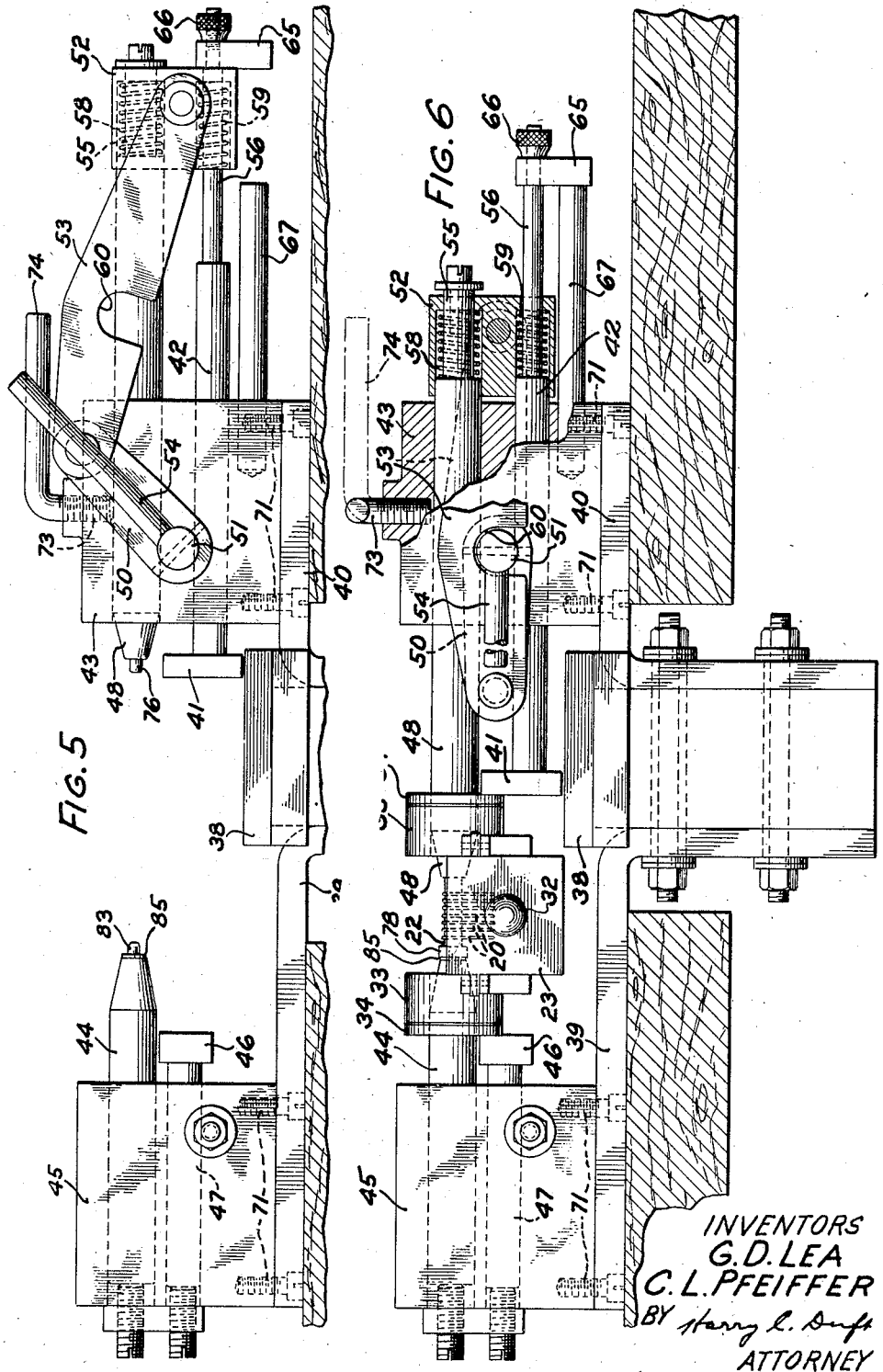

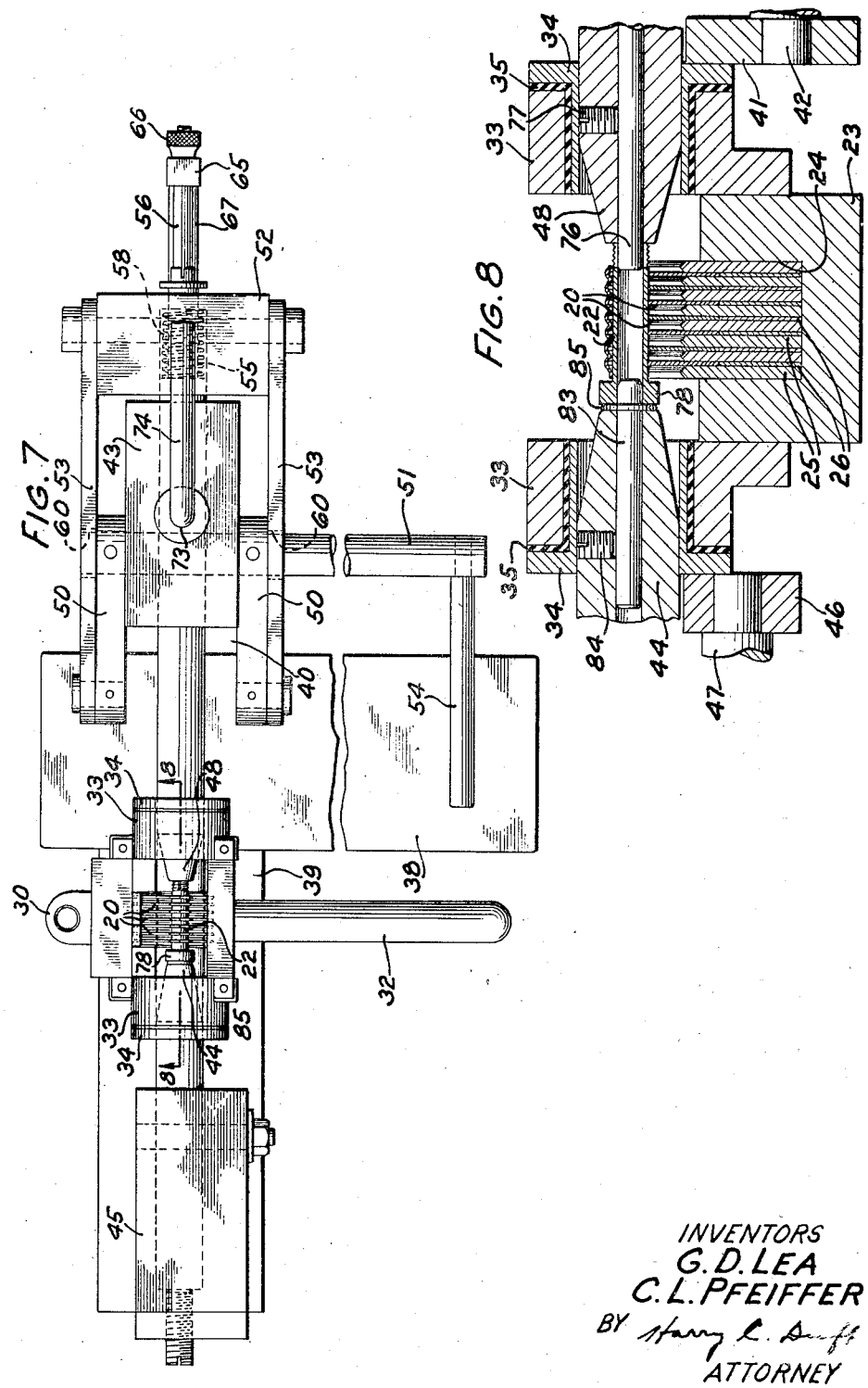

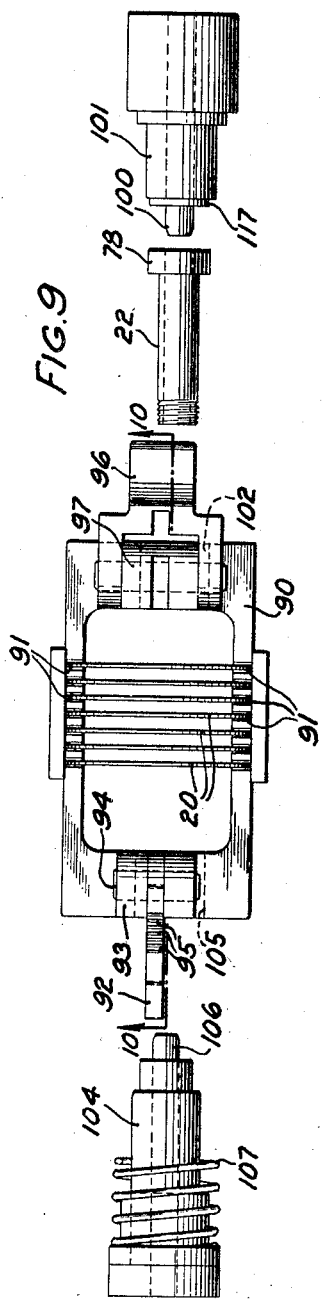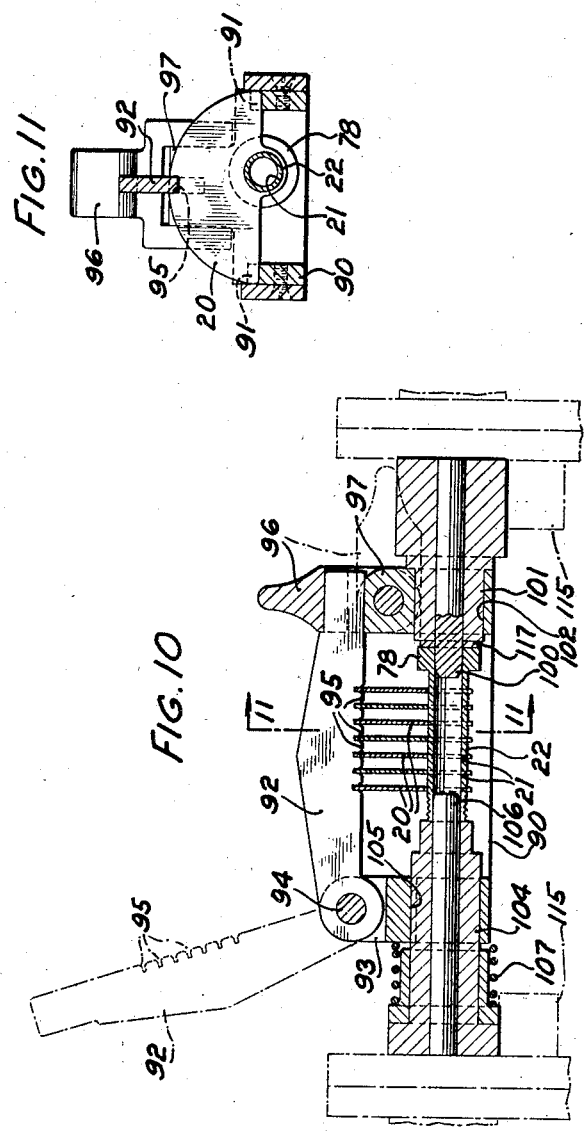

Feb. 10, 1948.  G. D. LEA ET AL  2,435,789
METHOD OF ELECTRIC SOLDERING
Original Filed April 13, 1943   5 Sheets-Sheet 5
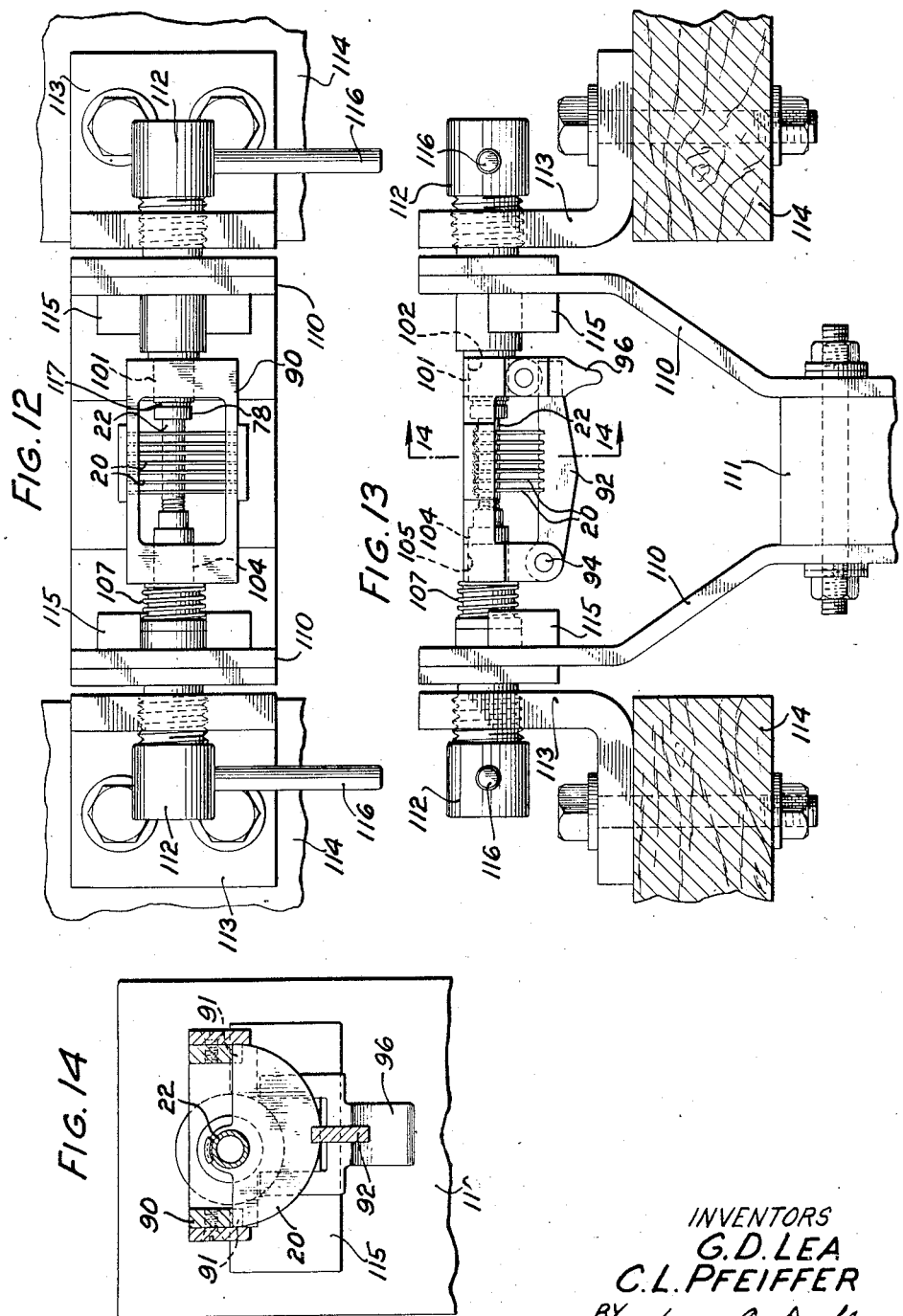
INVENTORS
G.D. LEA
C.L. PFEIFFER
BY Harry C. Duft
ATTORNEY Patented Feb. 10, 1948

2,435,789

UNITED STATES PATENT OFFICE 2,435,789

METHOD OF ELECTRIC SOLDERING

George D. Lea, Downers Grove, and Conrad L. Pfeiffer, Chicago, Ill., assignors to Western Electric Company, Incorporated, New York, N. Y., a corporation of New York Original application April 13, 1943, Serial No. 482,870, now Patent No. 2,410,665, dated November 5, 1946. Divided and this application May 4, 1944, Serial No. 534,068

3 Claims. (Cl. 219—12)

This invention relates to a method of assembling articles and more particularly to a method of soldering condenser plates to a supporting shaft and is a division of our co-pending application, Serial No. 482,870, filed April 13, 1943, now Patent No. 2,410,665, dated November 5, 1946.

In the manufacture of electrical condensers of the variable type having a plurality of apertured plates mounted on a rotatable shaft and adapted to inter-mesh with a corresponding number of fixed plates, it is sometimes the practice to solder the plates to the supporting shaft. In some cases, these plates have been mounted on the shafts by assembling the plates on the shaft in a suitable holder and then applying solder to the shaft, using a soldering iron to heat the solder. Such a method is slow and does not always provide a strong bond between the plates and the shaft.

An object of the present invention is to provide an efficient and effective method for assembling articles and particularly for soldering parts in an assembling operation.

In accordance with the aforementioned object, one embodiment of a soldering apparatus, by means of which the method may be practiced, may be provided having a removable condenser plate holder grooved to receive and position the apertured condenser plates and a pair of electrodes connected to a suitable source of high amperage, low voltage current, and movable to contact each end of a condenser shaft previously inserted through the plates. An annular flange of a material having high electrical resistance is formed about the tip of one electrode to increase the heating of the shaft end contacted thereby.

Other objects and advantages of the present invention will be more apparent from the following detailed description taken in conjunction with the drawings, which illustrate different embodiments of apparatus by means of which the method may be practiced, wherein Fig. 1 is an exploded perspective view of a single condenser plate and shaft;

Fig. 2 is a plan view of one type of condenser plate holder to be used in accordance with this invention, the condenser shaft being shown in position ready to be inserted into the apertured plates;

Fig. 3 is a sectional view along the line 3—3 of Fig. 2;

Fig. 4 is a sectional view along the line 4—4 of Fig. 2;

Fig. 5 is a side elevation of one type of soldering apparatus used in accordance with this invention;

Fig. 6 is a view of the same apparatus, partly in section, showing, however, a condenser holder in position between the electrodes;

Fig. 7 is a plan view of the apparatus shown in Fig. 6;

Fig. 8 is an enlarged sectional view along the line 8—8 of Fig. 7;

Fig. 9 is a plan view of another type of condenser plate holder used in accordance with this invention, the condenser shaft being shown in position ready to be inserted into the apertured plates and opposite electrodes in position for insertion in the holder;

Fig. 10 is a sectional view along the line 10—10 of Fig. 9;

Fig. 11 is a sectional view along the line 11—11 of Fig. 10;

Fig. 12 is a plan view of a soldering apparatus designed to use the holder shown in Figs. 9, 10 and 11;

Fig. 13 is a side view of the apparatus shown in Fig. 12; and

Fig. 14 is an enlarged sectional view along the line 14—14 of Fig. 13.

The present apparatus, which is used in practicing the method of this invention, is devised to facilitate the assembly of condenser plates on a rotor shaft. It is particularly desirable that such plates be rigidly mounted on the rotor shaft and be attached strongly enough thereto so that the spacing between the plates may be adjusted by bending the plates after they are assembled on the shaft to adjust the capacity of the condenser.

In the apparatus shown in the drawings, a plurality of substantially semi-circular condenser plates 20, each having an aperture 21 formed therein to receive a condenser shaft 22, may be positioned in spaced relation in a holder block 23 which supports them during the soldering operation.

A rectangular recess 24 is formed in the midportion of this block 23, as shown in Figs. 3 and 4, and a number of separator plates 25, of a thickness equivalent to the separation desired between the condenser plates 20, are mounted therein, being spaced from each other by spacers 26, which are of substantially the same thickness as the condenser plates. The upper portion of each separator plate 25 is tapered to facilitate insertion of the condenser plates therebetween and a semi-cylindrical recess 27 is formed in the middle upper portion thereof to permit the condenser shaft to be inserted through the apertures 21 in the condenser plates when they are assembled in the holder. The upper surfaces of the spacers 26 are sufficiently below the tapered upper portions of the separator plates 25 to permit the condenser plates 20, when assembled in the holder, to extend down between the separator plates 25 a sufficient distance to be securely supported, the lower edge of each condenser plate 20 resting on the upper surface of the corresponding spacer.

In order to lock the condenser plates in position when assembled in the holder, the upper right hand side of the block 23, as shown in Fig. 4, is slotted to receive a bar 30, which is slidably positioned therein. The forward end of this bar is beveled so that, as the bar is pressed against the upper edges of the condenser plates 20 by an operator, it will force the plates 20 down and against the underside of an inwardly projecting ledge 31 of the opposite side of the block 23, thus locking the plates firmly in position. The condenser shaft 22 may then be inserted through the apertures 21 in the plates, as shown in Fig. 3.

After the plates have been assembled in the recessed block 23, the holder is transferred to a soldering apparatus, shown in Figs. 5 and 6. A handle 32 is fixed to the block 23 to facilitate moving it. It will be noted that a pair of cylindrical bearing blocks 33 are mounted, one at each end of the block 23 and are provided with flanged inner sleeves 34 insulated from the cylindrical bearing blocks 33 by flanged inner sleeves 35 of non-conducting material.

The base of the holder block 23, when first placed on the soldering apparatus, shown in Fig. 5, is supported on a platform 38, which is made of an insulating material and rests on the elbow portions of two L-shaped, oppositely disposed, conducting bars 39 and 40, the downwardly extending portions of which are connected to a suitable source of current of high amperage and low voltage (not shown). A pusher block 41 is fixed to the end of a slidably mounted shaft 42, which is journalled in the lower portion of a housing 43, mounted on the horizontally extending portion of the right conducting bar 40. This block is used to move the condenser assembly holder to the left and thus to engage the left end of the condenser shaft 22 with a fixed tubular electrode 44 which then extends through the left inner sleeve 34 of the condenser assembly holder and contacts the headed end of the condenser shaft, as shown in Figs. 6, 7 and 8. This fixed electrode is adjustably mounted in a housing block 45, which is mounted on the horizontally extending portion of the left conducting bar 39. A block 46 is positioned immediately beneath the electrode 44 and serves as a stop member for the condenser assembly holder being fixed to the end of a rod 47, which is adjustably mounted so as to correctly position the electrode with respect to the condenser shaft.

Immediately above the pusher block 41 and movable by a common reciprocating means, to be described hereinafter, is a second tubular electrode 48, which is slidably mounted in the upper portion of the housing 43 and engageable with the right end of the condenser shaft. The forward portions of both electrodes are tapered to facilitate entry into the sleeves 34 at either end of the condenser assembly block 23. The pusher block 41 and the right electrode 48 are, as aforesaid, reciprocated by a common means comprising a pair of crank arms 50 keyed to a rotatable shaft 51 and connected to a spring housing block 52 by a pair of link arms 53, which are pivotally attached thereto. A handle 54 is fixed to one end of the shaft 51 to facilitate rotation thereof. The housing block 52 is apertured to receive the reduced rear portions 55 and 56 of the electrode 48 and the rod 42, respectively, which extend through these apertures, as shown in Figs. 5 and 6. A pair of helically coiled springs 58 and 59 are positioned about the reduced portions 55 and 56, respectively, and within the spring housing block 52 to yieldably move the electrode 48 and pusher block 41 to the left when the spring housing block is reciprocated by rotating the shaft 51 in a counter-clockwise direction.

As the block and electrode are moved in this manner, the condenser plate assembly holder resting on the platform 38 is consequently moved to the left, being supported at first by the platform 38 and then, as the holder is moved further to the left, being supported by the tubular electrodes 44 and 48. It will be noted that the link arms 53 are provided with recesses 60 of such a size as to receive the shaft 51, thus permitting the arms 53 to be advanced to a self-locking position when the shaft 51 is rotated as far as possible.

In order to prevent damage to the holder assembly, a stop member 65 is adjustably fixed to the rear end 56 of the rod 42 by a knurled nut 66. The position of the stop member 65 is adjusted on the rod 42 so that when the pusher block 41 has been advanced sufficiently to position the condenser assembly holder on the electrodes, it contacts the end of a rod 67 which is fixed to and extends from the lower rear portion of the housing 43, and prevents the block 41 from moving further to the left.

Since the left electrode 44 is fixed in its associated housing block 45, a good electrical contact is assured. However, the right electrode, which is slidably mounted in its housing block 43, does not of itself contact the housing block well enough to provide a suitable low resistance connection and, therefore, a threaded member 73 having its upper portion 74 bent to form a handle is threadedly mounted in the upper side of the housing block and, when the electrode 48 has been advanced fully to the left, is rotated by the handle 74 to press against the electrode, thus insuring good electrical contact. The conducting bars 39 and 40 are fixed to the electrode housings 45 and 43, respectively, which are made of conducting material having a low resistance, such as copper, by a number of bolts 71 to insure a low resistance connection.

Hereinbefore, it was stated that each inner bearing surface or flanged sleeve 34 is insulated from the rest of the associating bearing block, and, consequently, from the holder by a pair of flanged inner sleeves 35 of insulating material. Were these surfaces not insulated from the condenser assembly holder, when current was applied to the electrodes in the soldering operation, a circuit would be possible through the block 23 of the assembly holder as well as through the condenser shaft and, since this block is of substantially heavier material than the condenser shaft 22 and, consequently, is a better conductor, the current would tend to avoid the shaft and instead to pass through the block. However, by providing these insulating flanges, the holder is insulated from the electrodes and the current is confined to the shaft 22.

In practicing the method of soldering condenser plates to a supporting shaft and in the operation of the apparatus above described, after the condenser plate holder has been positioned between the electrodes and the electrodes brought into engagement with the ends of the condenser shaft, a suitable soldering flux may be brushed on the shaft to prepare it to receive the solder. A strip of solder preformed so as to fit in the interstices between the plates, and thus to contact the shaft, may then be placed on the shaft and current applied to the shaft through the electrodes. A current on the order of 1,000 amperes at 1½ volts has been used with satisfactory results. Should the solder tend to run down to the underside of the shaft, and thus to be unevenly disposed about the shaft, the condenser assembly holder may be rotated by moving the handle 32, associated therewith, up or down, the holder being rotatably supported on the electrodes 44 and 43. At the completion of the soldering operation, the electrode 48 is moved to the right to release the holder and the holder removed from the soldering apparatus. By withdrawing the bar 30 which holds the plates in position in the block 23, the soldered condenser assembly may then be readily removed.

Some types of condenser shafts have one end threaded and slotted, as shown in Fig. 1. It has been found that when current is applied to a condenser shaft, such as that shown in Fig. 1, sufficient heat may be developed in the condenser shaft to melt solder applied thereto but that some solder may tend to run down into the slots in the condenser shaft and may remain when the shaft cools. If the solder remains in the slots after completing the soldering operation, it must ordinarily be removed by hand.

In order to prevent the solder from running down into the slots, in accordance with the present invention, the right electrode 48 is provided with a conducting rod 76, a portion of which is inserted in the hollow inner portion of the electrode and held in place by a set screw 77. This rod is long enough so that a short portion thereof extends from the end of the electrode 48 sufficiently to project into the slotted end of the shaft 22 when the electrode is moved fully to the left, the rod being of such a diameter that it then fits closely within the shaft. The rod is made of a material which has a sufficiently low resistance relatively to the resistance of the material of which the shaft is made so that it will remain relatively cool during the soldering operation while at the same time having satisfactory heat conducting ability. Since the shaft, during the soldering operation, will tend to heat the rod, consequently the portion contacting the rod will tend to remain cooler than the rest of the shaft. Aluminum is particularly well suited since, in addition to having both low resistance and satisfactory heat conductivity, solder adheres very poorly thereto.

It is sometimes the practice to provide condenser shafts with a hub 78, as shown in Fig. 1. Because the amount of metal at this end of the condenser shaft is thus substantially greater than the amount at the other end, unless more heat is applied to this enlarged end than to the other end of the condenser shaft, the heating of the shaft will not be uniform throughout its length. In practice, it has been found that in order to heat the enlarged end sufficiently to melt the solder applied thereto, using similar electrodes and conducting rods at each end, a period and temperature of heating is required which cause the solder at the smaller end of the shaft to burn off.

In order to overcome this difficulty and to provide uniform heating of all portions of the condenser shaft, the enlarged end of the shaft is heated conductively in addition to the heating developed by the resistance of the shaft when a current is applied thereto. A conducting rod 83 of a high resistance material, such as nichrome, is positioned in the tubular electrode 44, a portion of the rod extending about three-eighths (⅜) of an inch from the forward end thereof similarly to the conducting rod 76. Because of the relatively high resistance of this rod, the rod itself heats considerably when current is applied thereto, and since the forward portion of this rod is inserted in the hub end of the shaft, this enlarged end is heated conductively.

In addition, a flange 85 is integrally formed at a point near the forward end of the rod 83, and extends circumferentially about the rod. When the rod 83 is inserted in the hub end of the condenser shaft, this flange firmly contacts the hub 78 and, since the flange is of the same material as the rod, it also heats when a current flows therethrough and this heat is transmitted conductively to the hub end of the shaft. The degree of heating may be closely controlled by employing thicker or thinner flanges. In practice, the flange is formed to a thickness on the order of .010" to .030", the precise thickness to be used being determined by the heat required. When more heat is required, a thicker flange is used than when less heat is required. By carefully selecting the thickness of the flange and the material of which the conducting rod is to be made, the heating of the condenser shaft may be controlled within very close limits as to areas. It will be understood, of course, that the resistance of the condenser shaft is sufficient to cause the major portion to heat and to melt the solder applied thereto.

A somewhat different, but equally efficient soldering apparatus, employing the principles of this invention, is illustrated in Figs. 9 through 14. Instead of employing a holder such as the holder 23, a rectangular frame 90 having a number of grooves 91 formed on the upper surface of the two opposing sides of the frame serves as a holder. Each of the grooves is wide enough to receive a condenser plate and the grooves are spaced so that a number of plates may be placed on the frame and held in alignment. An arm 92 is pivotally supported on a bracket 93 by a shaft 94, journalled in the bracket 93, which is integrally formed with one end of the frame, and a portion of the underside of this arm is provided with grooves 95 similar in shape to the grooves 91 in the upper surface of the frame. When the desired number of condenser plates has been assembled on the frame 90 and positioned in the grooves 91, the arm 92 is pivoted to engage the grooves 95 with the upper edges of the plates, thus locking them in the frame, as shown in Fig. 10. The arm 92 is itself then locked in place by a fork-shaped latch 96 pivotally mounted on a bracket 97 which is integrally formed with the other end of the frame. The latch 96 is formed to engage closely the end of the arm 92 when pivoted into position so as to prevent any movement of the arm during the subsequent soldering operation.

After the condenser plates have been assembled in the holder and locked in position, the condenser shaft is then inserted in the plates. With the particular type of holder now being described, positioning of the shaft is most easily effected by inserting a conducting rod 100, positioned in a tubular electrode 101, in the hub end of the condenser shaft, the rod 100 being long enough and of such a diameter as to closely engage and to support the shaft. The shaft may then be inserted through an aperture 102, which is aligned with the apertures in the condenser plates, in the right end of the frame 90. Thus, the shaft may be inserted therethrough and into position in the plates.

A second cylindrical electrode 104 is then inserted in an aperture 105 in the other end of the frame 90, this aperture being similar to the aperture 102, to position a conducting rod 106, mounted therein, in the other end of the shaft from that in which the rod 100 is inserted. A spirally coiled spring 107 mounted on the electrode 104 then engages the left end of the frame and serves to provide a firm yet resilient contact between the electrode and the soldering apparatus, as will be explained hereinafter. The rear portion of each electrode is shouldered, as shown in Fig. 9, to prevent the electrode from being inserted too far into the frame and possibly damaging the condenser assembly.

After the condenser shaft plates and the electrodes have been assembled in the holder, the holder is transferred to a soldering apparatus shown in detail in Figs. 12 and 13. In general, this apparatus is quite similar to the soldering apparatus illustrated in Figs. 5 through 8. However, in certain respects it has been modified to adapt it to this second type of holder. Referring particularly to Fig. 13, it will be seen that a pair of flat conducting bars 110 are mounted on either side of an insulating block 111 and extend upwardly between a pair of threaded members 112 threadedly mounted on oppositely disposed, rigid, spaced, L-shaped brackets 113 which are fixed to a table 114, the ends of the threaded members 112 engaging the outer sides of the conducting bars 110. These bars are resilient and their upper portions may be forced closer together or permitted to move farther apart by rotating the members 112, and are connected to a suitable low voltage, high amperage current supply (not shown).

In order to support the condenser holder between the conducting bars 112 during the soldering operation, semi-cylindrically recessed blocks 115 are fixed to the inner side of both of the bars 110 at a point near their upper ends. After the electrodes have been positioned in the frame 90, the left electrode is pressed toward the right electrode against the spirally coiled spring 107 and the assembly transferred to the soldering apparatus, the electrodes being positioned in the semi-cylindrically recessed blocks 115 and extending between the bars. The threaded members 112 are then rotated by lever arms 116, fixed to the ends thereof, to force the conducting bars together and thus to engage firmly the electrodes and consequently to insure a good electrical contact therewith.

It will be noted that a flange 117 is positioned about the conducting rod 100, mounted in the right electrode, and contacts the enlarged portion or collar of the condenser shaft when assembled in the holder. The purpose of this flange, which may be integrally formed with the rod, is the same as that of the flange 85 described hereinbefore; that is, to obtain uniform heating throughout the shaft by conductively heating the enlarged end of the shaft. The rod 100 and flange 117 are made of a suitable high resistance material, such as nichrome, while the other rod 106 is made of a low resistance material, such as aluminum, for the same puropse as the rod 76, hereinbefore described.

During the soldering operation, molten solder may tend to run to the underside of the shaft, and thus not be evenly disposed around the shaft. The present holder, however, is substantially freely rotatable and, therefore, if the solder exhibits this tendency, the holder may be rotated to overcome it.

What is claimed is:

1. A method of mounting condenser plates on a metallic shaft of non-uniform cross-sectional area comprising assembling said plates on said shaft in spaced relation, passing an electric current through said shaft to heat said shaft, and supplementing said heating by conductively heating the area of said shaft of larger cross-section.

2. A method of mounting condenser plates on a metallic shaft having an enlarged end portion comprising assembling said plates on said shaft in spaced relation, passing an electric current through said shaft to heat said shaft, and supplementing said heating by conductively heating the enlarged end of said shaft to obtain uniform heating throughout the shaft.

3. A method of soldering a plurality of condenser plates to a metallic shaft having one end enlarged to form a hub comprising assembling said plates on said shaft in spaced relation, passing an electric current through said shaft to heat said shaft, supplementing the heating at the enlarged end of said shaft by conductively heating said end, and reducing the heating at the opposite end to prevent solder from spreading too far by conductively cooling said end.

GEORGE D. LEA.
CONRAD L. PFEIFFER.

REFERENCES CITED

The following references are of record in the file of this patent:

UNITED STATES PATENTS

| Number | Name | Date |
| --- | --- | --- |
| 455,420 | Thomson | July 7, 1891 |
| 501,755 | Bain | July 18, 1893 |
| 1,062,388 | Ford | May 20, 1913 |
| 1,679,730 | MacDonald et al. | Aug. 7, 1928 |
| 1,872,494 | Peterson | Aug. 16, 1932 |
| 2,223,312 | Briggs | Nov. 26, 1940 |
| 2,257,643 | Paschke | Sept. 30, 1941 |
| 2,316,506 | Doelker et al. | Apr. 13, 1943 |